Figure 1:
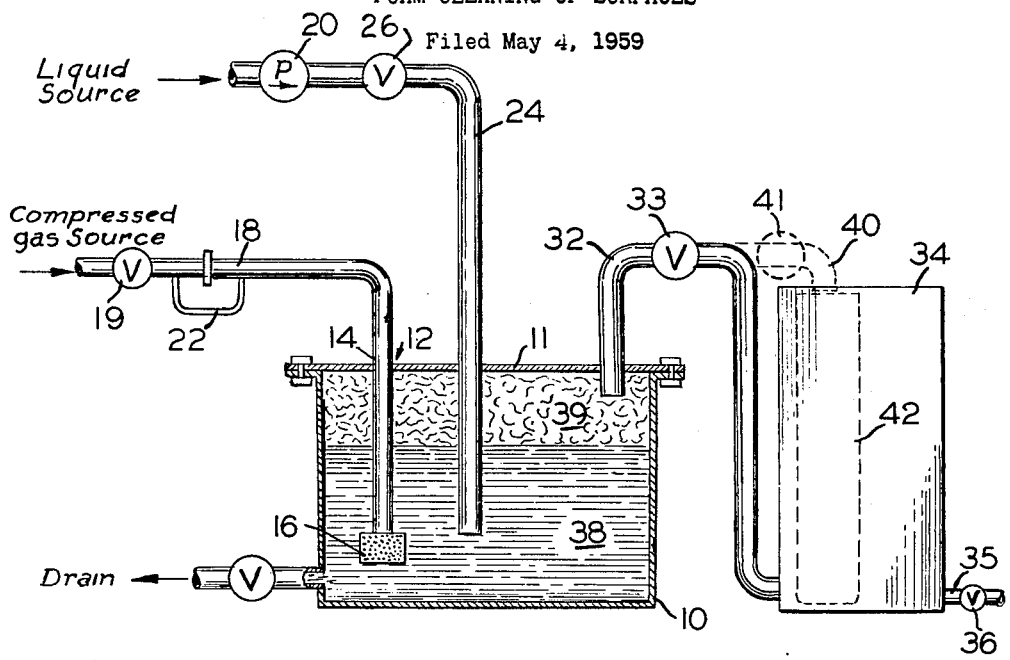

June 5, 1962  J. W. BRENNER ETAL  3,037,887
FOAM CLEANING OF SURFACES
Filed May 4, 1959

INVENTORS
JOHN W. BRENNER
JAMES P. ENGLE
BY
*CW Carlin*
ATTORNEY

United States Patent Office 3,037,887
Patented June 5, 1962

3,037,887
FOAM CLEANING OF SURFACES
John W. Brenner, Richmond, Va., and James P. Engle, Tulsa, Okla., assignors to The Dow Chemical Company, Midland, Mich., a corporation of Delaware
Filed May 4, 1959, Ser. No. 810,837
9 Claims. (Cl. 134—22)

The invention is concerned with cleaning the interior surfaces of vessels by the application of a chemical reagent. It is more particularly concerned with the removal of scale from the interior surfaces of vessels upon which mill scale has formed or upon which scale has formed as a result of physical and chemical changes which occurred while such surfaces were in contact with a liquid or gas. A change in temperature illustrates a physical change and interaction between the surfaces and a liquid or gas confined in the vessel illustrates a chemical change.

The term vessel as used herein refers to any system, unit, apparatus, or part thereof which is used to confine a fluid, e.g., tanks, transfer lines, steam boilers, heat exchangers, fractionating columns, cooling towers, refrigeration coils, distillation units, and pockets, cavities, or the like in assembled or fabricated equipment.

Scale may be defined as the incrustation which forms on a surface due to the contact therewith of a liquid or gas including the ambient atmosphere during fabrication or periods of disuse. Scale consists of a wide variety of materials among which the following are prominent: carbonates, phosphates, oxides, sulfides, sulfates, silicates, and organic deposits. Scale varies in physical characteristics. For example, it may be of a semi-solid waxy, greasy, or tarry nature; a hard, dull solid of substantially uniform texture; a stratified or unstratified rock-like composition; or particulated, loose, or cementitiously bonded aggregate.

Water containing dissolved materials passing through iron or steel tubes in a heat exchanger or boiler illustrates a specific example of a common domestic and industrial operation wherein scale forms and accumulates, requiring, after a period of usage, either removal of the scale or replacement of the tubes. A gaseous chemical passing through an overhead line, which forms a scale on the inner surface thereof requiring removal therefrom, further illustrates an industrial operation ultimately requiring scale removal or line replacement. The application of the invention to the removal of scale, and particularly to those types set out as illustrative above, will be made clear in the ensuing description of the invention.

Scale as defined above must be removed or the vessels in which it has formed replaced or, if possible, repaired, for a number of reasons among which are the gradual, partial or complete obstruction of passage of fluid through such vessels by the accumulation of scale and loss of heat transfer through the walls thereof due to the insulating properties of the scale. Such obstruction and loss of heat transfer result in lost capacity, reduction in contacting area, waste of fuel, need for excessively high temperatures, and metal creep often leading to the rupture of the vessel, e.g., a tube or line, with concomitant loss of materials and production.

The removal of such scale prior to extensive loss of efficiency is clearly to be preferred over replacement or repair, either of the latter of which entails prolonged down-time and costly maintenance.

Scale of the type herein especially concerned, viz., that deposited on the interior of vessels, ordinarily cannot be removed by mechanical means such as brushing or scraping and therefore methods which employ liquid solvents have been chiefly explored in attempts to remove the scale. Various liquid compositions and varying procedures for using them have been proposed. Such liquid compositions have a solvent action upon the scale sufficient to dislodge it at least to some extent when in contact therewith. Basically, conventional methods of using such compositions consist of filling a unit to be descaled with the liquid solvent, allowing the scale to soak for a time in contact with the solvent, and thereafter removing the solvent containing more-or-less amounts of scale from the unit. Some procedures require a series of steps employing more than one liquid solvent in a prescribed sequence, often interspersed by flushing with a neutralizer and/or water, and, in some instances, finally treating with a passivator, i.e., a composition which tends to inhibit oxidation of the treated surfaces. Under limited conditions and circumstances, such liquid compositions and methods have been highly successful.

There are, however, definite disadvantages attendant upon the use of conventional methods of descaling. Particularly prominent among such disadvantages is the great weight of the liquid usually required which leads to complete structural failure, especially of towers and large overhead lines. Such towers and lines are often designed to carry, during their ordinary use, either a gas, which is inherently of relatively low density, or a liquid which occupies only a fraction of the cross-section of the line. In a successful descaling operation, the treating composition must contact the entire inner surface of such tower or line because, even though the tower or line is not full when in use, some scale is formed on surfaces not continuously in contact with a liquid passing therethrough as a result of splashing, vaporization, and surging of the liquid. Completely contacting such inner surfaces usually must be accomplished by filling the tower or line with liquid solvent.

Further disadvantages attendant upon the use of known methods of descaling are: excessive consumption of large volumes of solvent necessitated by the need to contact with a liquid the entire area of the vessel being descaled; an undesirable dilution of the solvent to attain the required volume unless an uneconomical and wasteful amount of solvent is used; strains and distortion (not necessarily culminating in collapse) of the vessels being descaled and particularly of supporting structure due to the weight of the liquid solvent necessary; inability of the descaling liquid solvent employed to carry in suspension sloughed or dislodged undissolved pieces of scale, which, therefore, remain lying in the lower part of the vessels so treated.

In view of the existent disadvantages inherent in conventional descaling operations, of which the above disadvantages are illustrative, there is a need for an improved method of descaling surfaces which employs a descaling composition which is of desirably high concentration, is capable of carrying suspended undissolved scale therein, which covers a large surface to be descaled per unit of weight without overloading the equipment to be treated, and which is readily and economically prepared at the site of usage, if so desired. The method of the invention meets this need, the mode of practice thereof being set forth in the ensuing description and defined in the appended claims.

Broadly, the invention is a method of treating a vessel or system used for confining a fluid to remove an adhering substance from the exposed interior surface thereof which consists essentially of delivering a stream of gas into a confined quantity of a liquid solvent for the adhering substance while dispersing the gas in the solvent to form a fluid solvent foam, continuing to deliver and disperse the incoming gas to force the foam so formed in a confined stream to the vessel or system being treated at a rate in excess of the collapse rate and to continue to form the foam so as to fill substantially and maintain so filled the vessel or system whereby foam is maintained in contact with the internal surface of the vessel or system until the foam at least wets the surfaces being treated and a substantial portion of the adhering substance is dissolved.

The force required to convey the foam into the vessel or system is derived from the gas employed to form the foam. A preferred embodiment of the invention employs a second foam prepared by passing a stream of gas into a substantially inert liquid, e.g., water, similarly as in the solvent foam, and forcing the second foam thus produced into and through the vessel or system being treated to serve as a flush or chaser by displacing the solvent foam containing a dissolved and/or suspended substance dislodged from the surface of the vessel or system.

The foam must be fluid, i.e., it must conform to the shape of the confining vessel and permit transfer from the foaming chamber through a connecting line and into the vessel being treated and wet surfaces with which it comes in contact.

Although, in the practice of the invention, it is sufficient that the vessel being treated be maintained substantially full during treatment, it is preferred that foam be formed and forced into the vessel at a rate sufficiently great to cause an advancement of the foam mass in the vessel. A minimum rate of a least 0.1 foot per minute along the surface of the vessel being treated is recommended.

A foam which consists of the solvent and entrained gas is satisfactory to attain the objects of the invention if it wets the surface being treated and is sufficiently resistant to collapse to maintain the vessel or sysem being treated filled or preferably to maintain a continuous flow of foam along the surfaces of the vessel being treated as above stated. The conversion rate of foam to liquid while in contact with the surfaces of the vessel being treated may be very small to provide the required wetting of the surface, e.g., a foam which yields as little as 0.01 milliliter of liquid per minute per liter of foam is sufficient to wet adequately the surface being treated. A conversion rate of greater than about 250 milliliters per minute per liter of foam approaches a maximum rate since foam having a rate greater than that would require an excessive rate of production to maintain the vessel in a filled condition.

To attain the ends of the invention, a wet foam, i.e., one having a relatively high percent of liquid therein, or a dry foam, i.e., one having a relatively low percent of liquid therein, may be employed. A wet foam provides more liquid solvent and usually cleans and descales faster. However, a relatively dry foam is lighter, requires less solvent, and carries more sloughed or dislodged particles suspended therein. Herein, for convenience, the liquid content of foams will be discussed as the ratio by volume of foam to liquid in the foam. A foam having a foam to liquid volume ratio of 2:1 is considered a maximum wetness to employ and a foam having a foam to liquid volume ratio of 250:1 is considered a maximum dryness to employ. A foam to liquid volume ratio of between 10 and 50 to 1 is usually used for the solvent foam and a somewhat higher foam to liquid ratio for the flush or chaser foam is recommended.

Either the foamed solvent or foamed chaser may be followed by or include a foam-breaking step, e.g., introducing a defoaming additament or a gas stream, preferably at a point near where the foam leaves the vessel being descaled. If desired, a neutralizing and/or passivating liquid may be foamed and forced through the vessel being descaled following the scale removal.

In the practice of the invention, any known liquid which is reactive with the scale to remove it and is not objectionably deleterious to the surface of the vessel being treated may be employed.

The selection of the solvent to employ in the practice of the invention is dependent upon the character of the scale to be removed. For example, when an iron oxide-containing scale known as mill scale is to be removed by the practice of the invention, a foam comprising an aqueous solution of a 5–30 percent HCl, usually containing an inhibitor to corrosion, is prepared and the interior of a vessel contacted therewith according to the invention. When a scale, soluble in a nitric and/or hydrofluoric acids is to be removed, a suitable solvent is selected, e.g., one consisting by weight of 10 percent $HNO_3$ and 2 percent HF in water.

The gas employed in the practice of the invention may be any gas which is substantially inert to the liquid solvent. Air is usually employed unless the oxidative effects thereof are objectionable. In such instances, nitrogen or an inert gas is usually employed.

Foaming or frothing is aided by addition to the liquid solvent of any known froth- or foam-producing aid. Usually such aids are substances known as surfactants which, by decreasing the surface tension of the liquid, render the liquid more readily foamable and the foam thus produced more stable, i.e., more resistant to collapse.

The froth or foam is produced by passing the gas in a divided state, i.e., broken into small bubbles, upwardly through a confined body of the liquid solvent, preferably containing a surfactant, having a liquid-free zone thereabove which is in communication with the vessel to be descaled, thereby forming a foam in the liquid-free zone and continuing to pass the gas into the liquid solvent and upwardly therethrough to force the foam so made into the interior of the vessel to be descaled as aforesaid. The vessel to be descaled is provided with an outlet to serve as an exit for foam and for dissolved or dislodged scale therein and to provide drainage for collapsed foam. Such outlet is located near the end of the vessel remote from the end through which the foam enters. The vessel may also be provided with an outlet nearer the foam entrance end as a supplemental means for drainage of the liquid from collapsed foam, if desired. This outlet preferably is provided with a trap so as to allow passage of liquid but not foam from the vessel.

In practicing the invention, a fluid foam which may be referred to as a solvent foam, is generated either (1) at a rate at least equal to or slightly in excess of the rate of drainage and collapse of the foam or (2) at a rate appreciably in excess of the rate of collapse and drainage and thereby produce a more-or-less continuous flow of foam through the vessel being descaled. In either mode of practicing the invention, the foam is maintained in contact with the internal surfaces of the vessel to be cleaned long enough to effect dissolution or dislodgement of adhering film or scale. Thereafter a substantially inert foam is generated in a manner similar to that employed with the solvent foam and is forced through the vessel being descaled to displace and thereby flush out the solvent foam containing scale which is dissolved or suspended therein. The flushing foam may be followed by a passivating foam prepared by foaming a liquid known to have a passivating effect upon exposed surfaces against oxidation, e.g., sodium nitrite solution in the case of a ferrous metal surface.

The preferred mode of practicing the invention is to replace the supply of solvent liquid to the foaming chamber (after the scale in the vessel being treated has been sufficiently dislodged) by the chaser liquid which in turn is replaced by the passivating liquid, if such is employed, without appreciable interruption. The solvent foam is thereby gradually replaced by the flushing foam and that in turn by the passivating foam in the vessel being treated.

The last foam employed, i.e., the flushing or the passivating foam, is caused to collapse in the vessel being treated as by allowing it to stand or introducing a jet of air, and the resulting liquid removed therefrom by draining the vessel, if means exists therefore, or the foam and/or liquid resulting therefrom is blown out by gas under pressure where the vessel does not permit of complete drainage.

A number of known frothing devices or foamers are satisfactory for the preparation of the foam or froth for use in the invention.

Figure 2:
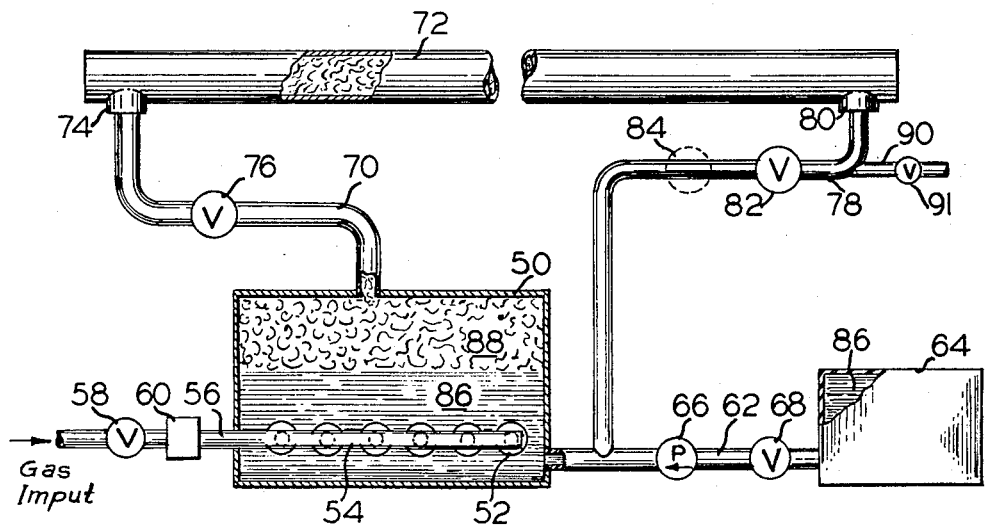

FIGURES 1 and 2 of the drawing are elevational views, largely in section, of foam-producing apparatuses or foamers employed in accordance with the invention for the removal of scale.

FIGURE 1 shows a readily assembled foamer of relatively simple design employed to remove scale from a vertical pipe or tower. The apparatus comprises cylindrical foam-making tank 10 provided with cover 11; sparger 12 extending through a hole provided therefor in cover 11 and consisting of stem 14 and nozzle 16 which contains a plurality of outlet holes about 40–60 microns in diameter; gas inlet line 18, having valve 19 therein and leading from a compressed gas source (not shown) through manometer 22 to the sparger stem; liquid inlet line 24, controlled by valve 26, leading from a source of liquid solvent (not shown) to pump 20 and thereafter through an opening provided in cover 11 to a point intermediate the bottom and mid-elevation of tank 10; foam outlet line 32, having valve 33 therein and extending from a point immediately below cover 11 through a suitable hole in cover 11 to vessel 34 which has scale-coated interior surfaces to be treated according to the invention; and vent line 35, having valve 36 therein, or removal of liquid from collapsed foam which contains dissolved or dislodged scale leading to a sump (not shown). Liquid solvent containing a surfactant dissolved therein is represented by numeral 38 and foam produced is represented by numeral 39. For purposes of demonstrating foaming characteristics of various liquid-gas compositions, alternative line 40 (having valve 41 therein) may be used to carry the foam being produced into the top of graduated cylinder 42 which serves as an alternative receiver. Line 40, valve 41, and cylinder 42 are shown by broken lines.

FIGURE 2 is another type of foamer and is shown employed for the removal of scale in accordance with the invention from an overhead line. It shows rectangular foaming chamber 50 in which are a plurality of substantially parallel horizontal porous tubes 52 near the bottom thereof. The porous tubes may be of porous ceramic, metal, or other porous material, e.g., alumina. Gas manifold 54 distributes gas to each of tubes 52 from common gas inlet line 56 leading from a source of gas (not shown) and controlled by valve 58. Flowmeter 60 is a means for indicating the rate of gas flow. Liquid inlet pipe 62 admits liquid from tank 64, forced therethrough by pump 66, into chamber 50 near the bottom thereof. Valve 68 controls the liquid flow through pipe 62. Foam outlet pipe 70 provides a means for the foam, being produced in chamber 50, to leave the chamber and be conducted therethrough to the interior of the vessel, which may be any piece of equipment from which scale is to be removed, here represented by overhead line 72. Coupling 74 connects foam pipe 70 near one end of line 72. Valve 76 controls foam flow into line 72. Foam drain pipe 78 is attached near the opposite end of line 72 by coupling 80. Valve 82 in pipe 78 provides a means for retaining foam in line 72 as desired. If deemed necessary, pump 84, represented by a broken line, may be placed in drain pipe 78 to provide a circulation means for empting line 72 before and/or following treatment. Liquid solvent 86 from tank 64 is shown partially filling chamber 50. In chamber 50, in a liquid-free zone above the liquid solvent therein, in foam outlet pipe 70, and line 72 being descaled, is foam 88. Eductor 90 is a pipe for the admission of a stream of gas, usually air, at relatively high pressure for collapsing the effluent from line 72. Valve 91 therein is a means for regulating flow of gas through eductor 90.

The invention is carried out by first making a fluid foam consisting of the intermixture of the liquid solvent and a gas. The solvent is put into the foam making chamber of a foamer, of which chambers 10 and 50 of FIGURES 1 and 2, respectively, are illustrative, to a level intermediate the top and bottom thereof, e.g., a level between ¼ and ⅞ full. A surfactant in an amount between 0.002 and 1.0 percent by volume of the solvent may be used to prepare the foam of the invention. However, an amount of surfactant between about 0.01 and 1.0 percent is usually used. Known inhibitors to metal corrosion may be admixed with the solvent, if corrosive to metal, in effective amounts, e.g., amounts between 0.1 and 1.0 percent by weight of the solvent.

Thickening agents may be admixed with the solvent if desired, to increase the viscosity. A liquid when made more viscous has been found to produce a more stable foam than the same liquid prior to the increase in viscosity. Illustrative of such thickeners are carboxymethylcellulose and gums, e.g., guar gum. Satisfactory frothing, however, is usually readily attained by judicial selection of the frothing agent, level of the liquid above the gas inlet, and ratio of gas volume to liquid volume in the foam, as explained hereinbelow.

The surfactant selected may be cationic, anionic, or non-ionic. Soaps which are water-dispersible and sufficiently stable in the solvent or any of a number of other surfactants referred to as detergents may be employed, e.g., a common household detergent having the following analysis:

| Percentage by weight: | Ingredient |
|---|---|
| 50.00 | Sodium tripolyphosphate. |
| 9.00 | Sodium dodecylbenzene sulfonate. |
| 7.00 | Sodium lauryl sulfate. |
| 2.00 | Sodium tallow sulfate ($C_{18}H_{38}OH$ reacted with $H_2SO_4$). |
| 10.00 | Sodium silicate (ratio of ($SiO_2$:$Na_2O$ was 3.22:1). |
| 5.00 | Moisture (average). |
| 2.00 | Monoethanolamine of lauric acid. |
| 0.70 | Sodium carboxymethyl cellulose. |
| 0.05 | Perfume. |
| 0.05 | Optical brightener. |
| Balance | Largely sodium sulfate. |

Other examples of preferred surfactants to employ in foaming various solvents are set out hereinafter.

The gas is introduced into the liquid solvent at between about 0.05 and about 25 to 30 inches beneath the surface of the liquid but usually between 3 and 20 inches therebelow. Drier foam is usually produced in a given foam system at shallower depth and wetter foam at greater depths. The rate of foam generation has been found to increase when both the rate of gas flow and the depth at which the gas is introduced below the liquid level are increased until an optimum depth has been reached which is usually between 7 and 15 inches. Further increases in the ratio of gas introduced and the depth at which the gas was introduced below the liquid level showed that the additional gas failed to increase the foam volume sufficiently to justify the additional gas being used.

The rate of gas being introduced into a body of a liquid solvent is controlled to produce the volume ratio of liquid to foam desired. The capacity of the foamer employed also determines the rate of gas being introduced to produce a foam of desired characteristics.

If desired, the foam may be continuously or intermittently circulated through the vessel being descaled and the foam containing dissolved and dislodged scale and some fluid from collapsed and/or drained foam recycled into the foamer and reused. If appreciable amounts of suspended material are present in the spent or partially spent foam, it may be passed through a filter or strainer positioned in the recycle line.

The effluent leaving the vessel being treated may consist of a mixture of foam and liquid drained from the foam. For the purpose of recycling, it is sometimes desirable that the effluent foam be reduced to a liquid and refoamed for reuse. Mechanical reduction of the foam to a liquid is readily attained by introducing a stream of a gas, e.g., air, into the recycle line. The gas is usually a stream as aforementioned, as by eductor 90. Chemical defoaming agents, e.g., a silicone-type antifoaming agent such as is described in U.S. Patent 2,632,736 may be employed but are not recommended where the liquid solvent of the collapsed foam is foamed again due to the residual adverse effect on refoaming the solvent.

The time during which foam is maintained in contact with the surface to be descaled varies dependent upon the thickness of and resistance to removal of the scale. Three hours are commonly employed. As many as five and as many as seven hours or more may be required to dissolve and dislodge the scale.

After filling the vessel being treated with the chaser foam, it is removed, either by causing it to collapse and removing the liquid thus formed by draining the vessel or by passing a gas through the vessel to blow the foam therefrom. Where the vessel has substantially complete drainage, the use of a gas is usually unnecessary. Drainage followed by some passage of gas is often employed in slow-draining or incomplete-draining units.

As aforesaid, the chaser foam may be followed by a passivator foam.

Tests 1 to 11, shown in Table I, were run to show the effect of employing various amounts of different surfactants for the production of foam for the purposes of the invention.

The tests were run by placing 1 liter of a 5 percent by weight aqueous solution of HCl containing 0.4 percent by volume of a corrosion inhibitor and a polyglycol surfactant in the amount set out in Table I in a foaming chamber similar to that shown as numeral 10 in FIGURE 1. The tests were run at about 80° F. It consisted of a liter wide-mouth Erlenmeyer flask provided with a two-hole stopper having sparger 14 and foam outlet tube 32 passing through the holes. Sparger 14 had nozzle 16 of fritted glass containing holes between 40 and 60 microns in diameter positioned about ⅓ inch above the bottom of chamber 10 which was about 4½ inches below the level of the solvent. Tube 32 led from the top of chamber 10 through line 40 to graduated cylinder 42.

Air at the rate of 1540 cc./min. was then introduced through line 24 and sparger nozzle 16 into the HCl-surfactant aqueous solution. Air was allowed to run for from 5 to 10 seconds to establish uniformity of flow before starting each test. The foam produced was recovered in a graduated cylinder 42 (substituted for vessel 34 in FIGURE 1 for the purposes of the tests) and the time in seconds required to produce 1 liter ascertained. The time in minutes required for the foam produced to collapse and the liquid portion of the collapsed foam were also measured in a number of the tests and are set out in Table I.

TABLE I

| Test No. | Amount of Foaming Agent [1] Added by volume | Time in Seconds to Produce 1 Liter of Foam | Time in Minutes for Foam to Collapse | Ratio of Foam to Liquid by Volume | Ratio of Air Used to Air in Foam | Percent Liquid in Foam by Volume |
| --- | --- | --- | --- | --- | --- | --- |
| 1 | 0.001 | (Inadequate foaming). | | | | |
| 2 | 0.002 | 166 | (Not Measured). | 6.8:1 | 5.00 | 14.8 |
| 3 | 0.003 | 44 | do | 10.3:1 | 1.45 | 9.7 |
| 4 | 0.010 | 35 | 12 | 8.9:1 | 1.01 | 11.2 |
| 5 | 0.100 | 33 | 18 | 6.4:1 | 1.00 | 15.6 |
| 6 | 0.500 | 33 | 18 | 5.9:1 | 1.02 | 17.0 |
| 7 [2] | 0.500 | 33 | (Not Measured). | 6.0:1 | 1.02 | 16.8 |
| 8 | 1.000 | 34 | 18 | 5.6:1 | 1.04 | 17.7 |

[1] The foaming agent was polyglycol produced by condensing 1 mole di-sec-butylphenol and 10 moles ethylene glycol.
[2] Nitrogen gas was used instead of air.

An examination of the results obtained in the tests of Table I shows that as little as 0.002 percent by volume of the polyglycol in the 5 percent HCl solution produced a satisfactory foam employing the apparatus described and using air at a rate of flow of 1540 cc./minute. It shows also, however, that at least 0.01 percent of glycol is to be recommended and that after 0.1 percent little improvement was noted.

The polyglycol surfactant employed in the tests of Table I was substituted by similar percents by other surfactants, e.g., sodium-N-methyl-N-oleoyl taurate and cocoamine acetate, and the tests otherwise repeated following the same procedure employed in the tests of Table I. Foam of similar character was produced satisfactorily at comparable rates and of comparable stability to that produced in the tests of Table I for like amounts of frothing agent except that at least 0.1 percent by volume appeared to be a minimum to employ with dependable results. Amounts up to and apparently in excess of 1.0 percent without any accompanying adverse effect on the foaming operation or the foam produced may be used.

Further tests were run employing an apparatus similar to that illustrated in FIGURE 1 to ascertain the effect on the production of foam for use in the practice of the invention wherein the concentration of HCl in the aqueous solvent was varied from 5 percent to 37.5 percent by weight. The solvent in each test contained the corrosion inhibitor employed in the tests of Table I and 0.5 percent by volume of the liquid surfactant described at the foot of Table II. The time to produce 1 liter of foam and the ratio of foam produced to liquid in the foam are set out in Table II.

TABLE II

| Test No. | Solvent Employed in Percent by Weight | Liquid Surfactant Employed, 0.5 Percent by Volume | | | | | |
|---|---|---|---|---|---|---|---|
| | | "A" | | "B" | | "C" | |
| | | Time[1] | Volume Ratio[2] | Time[1] | Volume Ratio[2] | Time[1] | Volume Ratio[2] |
| 9 | Water | 33 | 5.95 | 32 | 5.53 | 32 | 0.06 |
| 10 | 5 percent HCl | 32 | 5.92 | 33 | 5.55 | 33 | 6.33 |
| 11 | 10 percent HCl | 31 | 6.39 | 33 | 5.55 | 33 | 5.53 |
| 12 | 15 percent HCl | 32 | 5.75 | 30 | 5.52 | 32 | 5.44 |
| 13 | 20 percent HCl | 33 | 5.53 | 30 | 5.48 | 33 | 5.38 |
| 14 | 25 percent HCl | 32 | 5.55 | 30 | 5.10 | 34 | 5.13 |
| 15 | 30 percent HCl | 32 | 5.13 | 31 | 5.62 | 33 | 4.77 |
| 16 | 37.5 percent HCl | 27 | 4.86 | 26 | 5.32 | 25 | 4.35 |

"A," condensation product of 1 mole di-secondary-butylphenol and 10 moles of ethylene oxide (nonionic).
"B," condensation product of 1 mole of octadecyl amine and 10 moles of ethylene oxide (cationic).
"C," condensation product of 1 mole trimethyl nonyl alcohol and 8 to 10 moles of ethylene oxide (nonionic).
[1] Time in seconds required to produce 1 liter of foam.
[2] Ratio of the volume of foam produced to the volume of liquid in the foam.

An examination of Table II shows that foam is produced at a satisfactory rate when employing any one of the three surfactants shown therein in water or in inhibited hydrochloric acid of a concentration ranging from relatively dilute 5 percent by weight to saturated acid at 37.5 percent.

Tests 17 to 27 which follow were run to ascertain the effect on rate of foam production and ratio of foam produced to liquid therein employing aqueous solutions of acidic solutions in comparison to hydrochloric acid. The concentration of the acidic solutions are as shown in Table III. Each was inhibited as above by the addition of 0.4 percent arsenite type inhibitor. The apparatus and method were otherwise substantially those employed in the tests shown in Tables I and II. The results are set out in Table III below. The three different foaming agents employed are described in the footnotes following Tables II and III.

TABLE III

| Test No. | Aqueous Acid Solution in Percent by Weight | Liquid Surfactant employed, 0.5 percent by volume of solvent | | | | | |
|---|---|---|---|---|---|---|---|
| | | "B" | | "C" | | "D" | |
| | | Time[1] | Volume Ratio[2] | Time[1] | Volume Ratio[2] | Time[1] | Volume Ratio[2] |
| 17 | Water | 32 | 5.53 | 31 | 6.45 | 32 | 5.21 |
| 18 | 5 percent HCl | 33 | 5.55 | 33 | 6.33 | 32 | 7.00 |
| 19 | 5 percent $H_2SO_4$ | 31 | 5.74 | 30 | 6.33 | 32 | 6.17 |
| 20 | 21 percent $H_3PO_4$ | 30 | 4.76 | 30 | 6.25 | 30 | 5.55 |
| 21 | 5 percent $HNO_3$ | 32 | 5.52 | 31 | 6.13 | 31 | 5.81 |
| 22 | 5 percent $HNO_3$ + 0.7 percent $NH_4HF_2$ | 33 | 7.41 | 32 | 8.93 | 33 | 8.34 |
| 23 | 5 percent sulfamic acid | 32 | 5.00 | 30 | 5.65 | 32 | 5.95 |
| 24 | 3 percent citric | 32 | 4.57 | 31 | 6.25 | 31 | 5.07 |
| 25 | 5 percent acetic | 32 | 4.93 | 31 | 5.53 | 31 | 4.85 |
| 26 | 5 percent oxalic | 32 | 4.77 | 32 | 6.06 | 32 | 5.27 |
| 27 | 5 percent formic | 32 | 4.86 | 32 | 6.10 | 31 | 5.32 |

"B" and "C", same as those given in footnote of Table II, supra. "D" Ammonium isopropyl benzene sulfonate (anionic).
[1] Time in seconds required to produce 1 liter of foam.
[2] Ratio of the volume of foam produced to volume of liquid in the foam.

An examination of the results set out in Table III shows that a foam is produced at a satisfactory rate employing any of the acidic solutions there shown.

Tests 28 to 34 which follow were run to illustrate the preparation of foam for neutralizing, passivating, cleaning, and flushing in accordance with the invention. The apparatus and method were substantially the same as in the tests of Tables I to III above except the aqueous solutions were those shown in Table IV.

Tests 28 and 29 illustrate rinses; 30 and 31 illustrate neutralizers; tests 32 and 33 illustrate general cleaning and degreasing; test 34 illustrates passivation. The types and amounts of the agents together with the rate and stability of the foams produced are set out in Table IV.

TABLE IV

| Test No. | Percent Active Ingredient in Aqueous Solution By Weight | Liquid Surfactant Employed, 0.5 percent by volume | | | | | |
|---|---|---|---|---|---|---|---|
| | | "B" | | "C" | | "D" | |
| | | Time¹ | Volume Ratio² | Time¹ | Volume Ratio² | Time¹ | Volume Ratio² |
| 28 | Water | 32 | 5.53 | 31 | 6.45 | 32 | 5.21 |
| 29 | 0.01 citric acid | 31 | 6.50 | 32 | 6.06 | 33 | 5.05 |
| 30 | 5 NaOH | 30 | 5.49 | (Inadequate Foaming) | | 32 | 6.05 |
| 31 | 3 Na₂CO₃ | 31 | 5.44 | 32 | 7.35 | 31 | 5.32 |
| 32 | 5 Na₃PO₄ | 32 | 5.00 | 32 | 7.25 | 32 | 5.08 |
| 33 | 5 Na₂SiO₃ | 32 | 5.32 | 32 | 7.41 | 31 | 5.35 |
| 34 | 0.5 NaNO₂ | 31 | 5.59 | 31 | 6.25 | 32 | 4.95 |

"B" and "C", are described in the footnote to Table II.
"D" is described in the footnote in Table III.
¹ Time in seconds to produce a liter of foam.
² Ratio of the volume of foam produced to volume of liquid in the foam.

An examination of Table IV shows that all solutions employed in Tests 28 to 34 foamed adequately when either a cationic or anionic surfactant was employed, and all but the aqueous solution of NaOH foamed adequately when the non-ionic surfactant was employed as the frothing or foaming agent. However, when the polyglycol employed in the tests of Tables I and II, also a non-ionic surfactant, was substituted for the non-ionic agent employed in the tests of Table IV, satisfactory frothing was obtained with the NaOH solution.

Some of the tests which were run at 80° F. were repeated at temperatures of 40° F., 120° F., and 200° F. Substantially uniform foaming results were obtained which were, for all practical purposes, the same as those obtained at 80° F.

A series of tests, numbered 35 to 41, were run to demonstrate foaming of organic solvents such as kerosene, diesel fuel, and trichloroethylene for use in the practice of the invention. The tests were run by admixing with the organic solvent selected, the additament set out in each of the tests of Table V, following the procedure and employing a foamer of the type shown in FIGURE 1. The foam thus made was collected in a graduated glass cylinder, represented by cylinder 42 which is shown by broken lines in FIGURE 1.

Tests 35 to 37 of this series of tests were run by admixing 0.5 percent of a surfactant with the organic solvent and pass air thereinto as in the above tests which employed an aqueous solvent. Test 38 was run by making a soap in situ in the organic solvent, as described hereinafter, prior to passing air thereinto, but to which no surfactant was admixed. Tests 39 to 41 were run by admixing 0.5 percent surfactant and also preparing a soap in situ at in test 38.

The surfactant employed in this series of tests was a cationic type prepared according to U.S. Patent 2,669,546 in an amount of 0.5 percent by volume of the gelled solvent. The surfactant employed in said U.S. patent is the lactate salt of 2-heptadecyl imidazolines having the general formula

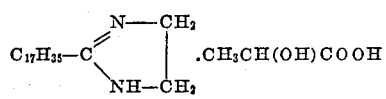

or such salt having an aminoethyl, benzyl, hydroxyethyl, or ethyl benzene radical substituted at the 1 position, i.e., for the H atom attached to the N atom in the above formula. After the mixture of gelled solvent and surfactant had been thus prepared, it was foamed in a manner similar to that employed in the previous tests and the rate of foam thus produced measured as in the above tests. The results are set out in Table V.

The soap used in the tests shown in Table V is formed in situ in the organic solvent by admixing, in the organic solvent, reactive quantities of an oil-soluble carboxylic acid or mixture of such acids and an aqueous solution of an hydroxide. In tests 38 to 40 of this series of tests, a mixture of tall oil and caprylic acid (octanoic acid) in an 8.5:1.5 volume ratio was employed. In test 41 unmixed tall oil was employed.

Tall oil is largely a mixture of abietic acid and fatty acids, the latter largely oleic acid and linoleic acid. Either crude or refined tall oil may be used although the latter is preferred. Refined tall oil usually falls within the following specifications:

| Color (Gardener) | Acid No. | Saponification No. | Iodine No. | Percent Fatty Acid | Percent Rosin Acid | Percent Unsaponifiables |
|---|---|---|---|---|---|---|
| 9-14 | 155-183 | 158-185 | 143-210 | 37-52 | 32-65 | 4.12 |

The hydroxide employed is any soluble hydroxide employed in an aqueous solution, usually a 25-50 percent by weight solution thereof. Reference to Table V shows that in tests 38 to 41, a 30 percent by weight aqueous solution of NaOH was employed in an amount of 25 percent by volume of the solvent in test 38 and in amount of 35 percent by volume in tests 39 to 41.

Table V sets out the organic solvents employed, the rate of foam production, and volume ratio of foam produced to liquid in the foam.

TABLE V

| Test No. | Organic Solvent | Surfactant, Percent by Volume | Gel Composition Used Percent by Volume of Solvent | | Time in Seconds to produce a liter of foam | Volume ratio of foam to liquid |
|---|---|---|---|---|---|---|
| | | | Organic Acid | 30 percent NaOH solution | | |
| 35 | Kerosene | 0.5 | None | None | No Foam Produced | |
| 36 | trichloroethylene | 0.5 | None | None | ...do... | |
| 37 | Diesel fuel | 0.5 | None | None | ...do... | |
| 38 | Kerosene | None | [1] 0.25 | 0.25 | ...do... | |
| 39 | Kerosene | 0.5 | [1] 0.25 | 0.35 | 60 | 5.00 |
| 40 | Diesel fuel | 0.5 | [1] 0.25 | 0.35 | 60 | 5.55 |
| 41 | trichloroethylene | 0.5 | [2] 0.25 | 0.35 | 25 | 7.41 |

[1] Tall oil and caprylic acid mixed 8.5:1.5 parts by volume added.
[2] Tall oil only added.

Tests 39 and 40 were repeated employing 0.5 percent by volume of a tetra-alkyl quaternary ammonium chloride surfactant in the gelled solvent instead of the alkyl imidazoline lactate. The general formula of the surfacant here employed is

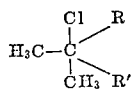

where R and R' are mixtures of alkyl groups of between 8 and 18 carbon atoms. A typical analysis showed R+R' to be a mixture of the following: 8 percent octyl, 9 percent decyl, 47 percent dodecyl, 18 percent tetradecyl, 8 percent hexadecyl, and 10 percent octadecyl. Foam was produced at substantially the same rate and showed substantially the same volume ratio of foam to liquid as are shown in tests 39 and 40 in Table V.

Tests 39 and 40 of Table V were again repeated employing a 0.5 percent by volume oil-soluble petroleum sulfontate as the surfactant instead of the lactate or tetra-alkyl quaternary ammonium chloride. The petroleum sulfonates are prepared by reacting NaOH with the mahogany sulfonic acids produced when petroleum fractions, e.g., kerosene, lubricating oil, or distillates, are treated with $H_2SO_4$. U.S. Patent 1,935,666 describes mahogany sulfonic acids, and the preparation of sodium salts thereof. Foam was produced of substantially the same quality as in tests 39 to 40 of the table.

Other organic solvents than those employed in the tests shown in Table V are $CS_2$, $CCl_4$, alcohols, aldehydes, benzene, and various other petroleum fractions in addition to kerosene and Diesel oil.

An examination of the results of the tests set out in Table V and of the tests therein which were repeated with other surfactants shows that foam is produced at a satisfactory rate by passing air into a foamer of the type shown in FIGURE 1 containing an organic solvent containing 0.5 percent surfactant and a gel formed in situ in the organic solvent by admixing therewith reactive quantities of an organic acid and an aqueous solution of a soluble hydroxide. It shows that the gel formed by reacting aqueous NaOH with a mixture of tall oil and an 8 carbon atom chain length fatty acid in the organic solvent substantially improved the rate of foam production over that obtained when the tall oil was used alone as the gel-forming acid.

The following examples, illustrative of the practice of the invention, were run:

Examples 1 to 4

Foam was prepared in a foamer similar to that shown in FIGURE 1 except that a 1 gallon wide-mouth jar, having a tight fitting cover with suitable holes therein, was employed as chamber 10 into which were inserted three spaced-apart spargers each similar to 14 of FIGURE 1, all three of which extended to a distance of only about ½ inch below the surface of the solvent in the jar. The positioning of the spargers in this manner was to produce a drier foam. The solvent consisted of a 5 percent by weight aqueous HCl solution containing 0.4 percent by volume of an abietyl amine type corrosion inhibitor and 0.5 percent by volume of sodium-N-methyl-N-oleoyl taurate as a foaming agent. The rate of air flow employed was varied as set out in Table VI below together with the rate of foam production and liquid content of the foam produced.

High temperature mild steel tubing was placed in an oven at 1850° F. for 1 hour during which mill scale consisting substantially of $Fe_3O_4$ formed on the outside and interior thereof.

To illustrate scale removal according to the invention, a number of four-inch long sections of the thus-treated tubing were cut, thus providing outside and interior scale-coated surfaces totaling 18.4 square inches on each section. The amount of scale on a typical heat-treated section was determined prior to proceeding with the practice of the invention and found to be 3.75 grams.

Sections of the scale-coated tubing were then successively suspended by means of a glass hook in a vessel positioned similarly to that represented by number 34 in FIGURE 1. Foams prepared as described above and having the characteristics set out in Table VI below were passed upwardly through vessel 34 for 0.5 hour for each successive section, thereby contacting each section for that period of time. The weight of scale, calculated as $Fe_3O_4$, which was removed from the sections by each foam is shown in Table VI.

TABLE VI

| Example Number | Air Flow in cc./min. | Time in seconds to prepare 1 liter of foam | Liquid in 1 liter of foam | Volume ratio of foam to liquid | Grams of scale removed |
|---|---|---|---|---|---|
| 1 | 2,640 | 23 | 53.0 | 19:1 | 3.74 |
| 2 | 2,560 | 23 | 18.5 | 54:1 | 3.28 |
| 3 | 1,040 | 57 | 8.8 | 114:1 | 2.81 |
| 4 | 880 | 68 | 5.0 | 200:1 | 2.61 |

An examination of the results obtained when the sections of mill scale coated steel tubing shows that foamed aqueous HCl at foam to liquid ratios of between 19 and 200 foam to 1 liquid removed a substantial portion of the scale in 0.5 hour; that a foam to liquid ratio of 19:1 removed substantially all of the scale, that increasingly dry foams removed a smaller percent of foam during the same treating period, but that a foam to liquid ratio of 54:1 is sufficiently effective for a large number of cleaning or descaling jobs.

Example 5

A three-foot long section of steel tubing, designated AISI 4130, 2 3/16 inches inside diameter, having a light coating of mill scale (largely tenaciously adhering iron oxide) on the interior thereof, formed during fabrication thereof, was descaled according to the invention. A foaming apparatus similar to the type shown in FIGURE 1 was employed except that three spargers were employed as in EXAMPLES 1 to 4. The steel section to be descaled was placed vertically in the position represented by vessel 34 in FIGURE 1 so that the interior would be contacted by foam passed upwardly therethrough. The procedure was as follows: 10 milliliters of sodium-N-methyl-N-oleoyl taurate and 8 milliliters of an arsenite type inhibitor to corrosion were admixed with 2000 milliliters of a 19.15 percent aqueous solution of hydrochloric acid to prepare the solvent. The aqueous solution thus made was transferred to chamber 10 and foamed by air according to the invention as described above, thereby causing foam to form and be forced upwardly through the pipe section being descaled (shown as 34 on FIGURE 1). Foam was passed continuously therethrough for 7 hours. A small portion of the foam drained and/or collapsed while passing through the tubing section and was drained out at the bottom. Most of the foam overflowed at the top, was allowed thereafter to collapse and the thus spent foam was transferred back to chamber 10 for reuse. Twenty-one passes were made through vessel 34.

Table VII below shows the results obtained by an analysis of the effluent foam after it had collapsed. The first analysis was made after 1 hour and 45 minutes, the next four readings after each additional hour and the last reading after an additional 1 hour and fifteen minutes.

TABLE VII

| Elapsed time: | Iron content of collapsed foam solvent in percent |
|---|---|
| 1 hr., 45 min | 0.26 |
| 2 hr., 45 min | 0.33 |
| 3 hr., 45 min | 0.36 |
| 4 hr., 45 min | 0.39 |
| 5 hr., 45 min | 0.44 |
| 7 hr | 0.51 |

Calculating, the iron present in the solvent as coming from $Fe_3O_4$, there were shown to be 15.4 grams of scale removed from the tubing section.

The acid solvent was then displaced from the tubing section as follows: 4000 milliliters of water were admixed with 20 grams of citric acid in the liquid supply source. This was 0.5 percent by weight solution of citric acid. The solution there made had a pH value of 3. The solution was then fed into chamber 10, frothed by introducing air through pipe 14, and the foam thus made forced through tubing section 34 in a manner similar to the procedure employed with the hydrochloric acid foam. Substantially all of the 4000 ml. of aqueous citric acid solution was converted to foam and passed through the section. The purpose of the citric acid foam step was to inhibit reformation of iron oxide scale which occurs to a limited extent when iron remains wet with water.

Thereafter the tubing section was treated with a passivator solution as follows: 2000 milliliters of water, 100 grams of sodium carbonate, 20 grams of sodium nitrite and 20 grams of sodium citrate were admixed in the liquid supply tank. The passivator solution thus made was foamed and passed through section 34 in a similar manner to the hydrochloric acid solvent and citric acid procedures above. The foam was passed through section 34 for 20 minutes and then allowed to collapse and the resulting liquid drained out.

The tubing thus treated was air dried and examined, it was found to be free of any mill scale and without indication of any after-rust formation.

*Example 6*

A second section of pipe, having a particularly heavy coating on the interior of mill scale and of the same size as that employed in Example 5, above, was employed. The foaming apparatus was the same as that exployed in Example 5. The solvent liquid was substantially the same, consisting of 1030 ml. of 17.65 percent by weight of aqueous HCl solution. It employed the same foaming agent and corrosion inhibitor, but in less amounts than in Example 5, Example 6 employing only 5.15 ml. of the foaming agent and 4.12 ml. of the inhibitor, in the solvent.

The method of Example 6 differed from that of Example 5 in the manner of contacting the interior of the pipe section 34. Instead of passing the foam through continuously at a rate of 21 times in seven hours as in Example 5, the foam in Example 6 was forced into the tube section only fast enough to insure the tube section's remaining full, i.e., only the foam which was converted to liquid in the tube was replaced by fresh foam. The liquid from the collapsed foam was allowed to drain out the bottom of the tube.

The tube section thus treated was flushed with the aqueous citric acid solution and the passivator solution as in Example 5. Calculation of the spent foam showed 35.2 grams of iron therein, calculated as $Fe_3O_4$ which had been removed from the tube. Examination of the tube showed a rust-free, clean surface.

*Example 7*

A foaming apparatus similar to that employed in the examples above was used in this example. A 15 percent by weight aqueous solution of HCl containing 0.2 percent by weight of an arsenite type inhibitor was prepared and placed in a suitable container for continuous transfer into foaming chamber 10 as needed. Pipe 18 was connected to a compressed air source. The level of the HCl solution was maintained substantially about ½ inch above the top of sparger nozzle 16. A heat exchange coil of mild steel, 105 feet long and 2 inches in inside diameter and having a capacity of about 17.1 gallons, was placed in connection with foam outlet line 32 similarly to vessel 34 of FIGURE 1. The interior of the coil was heavily coated with mill scale.

Air was released into the solvent liquid at a controlled rate sufficient to produce foam at an average rate of 3.4 gallons per minute. The foam thus produced was forced by the air through the coil. The volume ratio of foam to liquid was 23 to 1. Upon leaving the coil the foam was collapsed by an injection of a fine stream of air (constituting an eductor) and the liquid thereby obtained recycled back into the foaming chamber. Samples of the foam leaving the coil being descaled were taken every 0.5 hour and an analysis run for iron content and residual acid. The foam was circulated through the coil for 5 hours. The results of the analyses are set out in Table VIII. They show a continuous increase in the percent Fe present and a general decrease in the HCl in the spent foam until the scale was substantially removed.

After the 5 hour circulation of the foamed acid solvent, a rinse foam was made and similarly circulated through the coil except the collapsed rinse was discarded. The rinse solution was an aqueous solution consisting essentially of 0.5 percent by weight of citric acid and 0.5 percent of sodium-N-methyl-N-oleoyl taurate as a foaming agent. Fifteen gallons of the rinse solution were foamed and circulated through the coil. Samples of the effluent were also taken and an analysis run for iron content and the pH determined. The results of the analyses are set out in Table VIII. The removal of a small amount of iron by the rinse foam was due to the complexing action of the citrate in the rinse foam.

Following the rinse foam, a neutralizer-passivator solution was foamed and circulated through the coil in a similar manner to the acid foam and the recycle step. The neutralizer-passivator solution was an aqueous solution consisting essentially by weight of 3 parts sodium carbonate, 1 part sodium nitrite, 1 part sodium citrate, 0.5 part of the same foaming agent employed in the rinse described above, and the balance water. The neutralizer-passivator foam was circulated through the coil for 50 minutes. Air was then blown through the coil for about 5 minutes to remove residual foam.

A section of the coil thus descaled and cleaned was cut open and examined. It showed a clean metal surface entirely free of scale, dirt, or surface film. After 5 days it was again examined and showed no indication of rust formation.

TABLE VIII

DRAIN SAMPLE ANALYSIS DURING SCALE-DISSOLVING STAGE

| No. | Treatment Time in Hours | Percent Fe | | Remaining HCl | |
|---|---|---|---|---|---|
| | | In Foaming Chamber | In Recycle Line | In Foaming Chamber | In Recycle Line |
| 1 | 0.5 | 1.05 | 1.52 | 13.4 | 12.8 |
| 2 | 1 | 1.34 | 1.45 | 13.1 | 12.9 |
| 3 | 1.5 | 1.48 | 1.53 | 13.0 | 12.9 |
| 4 | 2 | 1.54 | 1.57 | 12.7 | 12.6 |
| 5 | 2.5 | 1.60 | 1.54 | 12.7 | 12.5 |
| 6 | 3 | 1.57 | 1.53 | 12.6 | 12.6 |
| 7 | 3.5 | 1.60 | 1.62 | 12.5 | 12.5 |
| 8 | 4 | 1.65 | 1.69 | 12.5 | 12.4 |
| 9 | 4.5 | 1.70 | 1.77 | 12.5 | 12.5 |
| 10 | 5 | 1.76 | 1.80 | 12.5 | 12.5 |

DRAIN SAMPLE ANALYSIS DURING RINSE STAGE

| No. | Treatment Time in Minutes | pH | Percent Fe |
|---|---|---|---|
| 1 | 0 | 2.4 | |
| 2 | 20 | 2.9 | 0.214 |
| 3 | 40 | 3.1 | 0.178 |
| 4 | 60 | 3.2 | 0.142 |
| 5 | 80 | 3.1 | 0.149 |
| 6 | 100 | 3.1 | 0.161 |

*Example 8*

A cylindrical tower equipped with bubble cap trays required scale to be removed from the interior thereof. The tower was 22 feet high and 3 feet in diameter. The tower contained six trays, 3 feet apart and a top tray one foot from the top. There were 16 bubble caps on each tray. The tower had been employed in a high temperature operation where it had been exposed to fires at temperatures between 800° and 1000° F. which had resulted in a heavy oxidic coating consisting largely of a hard adherent mixture of $Fe_3O_4$ and $Fe_2O_3$.

The tower was treated as follows:

A foamer similar to that shown in FIGURE 1 was employed. An acidic liquid scale solvent was prepared by admixing, in the foamer chamber 10, one hundred gallons of 15 percent by weight hydrochloric acid, 0.2 gallon of 4 percent aqueous arsenite type corrosion inhibitor and a polyglycol surfactant prepared by condensing 1 mole of disecondary butylphenol with 10 moles of ethylene oxide. The foaming chamber was about half full of solvent, the top level of which was an average of about 7½ inches above the sparger openings.

An air line similar to 18 leading from foaming chamber 10 of FIGURE 1 was connected to an air compressor to provide air to chamber 10 and foam outlet line 32 was connected to the lower part of the tower to be descaled, similarly positioned to vessel 34 of FIGURE 1. Foam was generated in a manner similar to the procedure followed in the prior examples. The tower filled with foam in about 10 minutes and began to overflow. The overflow from the tower was recycled back to chamber 10. Some of the liquid formed from the foam during treatment drained to the bottom of the tower and was collected and also recycled.

Treatment as thus described continued for 3 hours and was then discontinued. The foam in the tower was allowed to stand and completely collapsed in 12 minutes and the resulting liquid was drained from the tower.

Recovery of all liquid from the foam was measured and found to be 90 gallons. Since the capacity of the tower was over 1200 gallons, it is apparent that only about 7½ percent by volume of the liquid was required to treat the tower, that would have been required had unfoamed liquid been used.

Upon examining the interior of the tower, the iron oxide was found to have been completely removed even from areas about the trays and bubble caps which are quite inaccessible for removal by other than a chemical agent.

The thorough removal of the scale by employing a relatively small volume and weight of liquid solvent shows the savings and practicality of the practice of the invention.

*Example 9*

The inside surface of an overhead transfer line for a gaseous chemical was heavily coated with an adherent scale containing copper acetylide. The transfer line was a carbon steel pipe about 550 feet long and 12 inches in diameter. Its fluid capacity was about 3240 gallons. The pipe was elevated about 12 feet above the ground by a supporting structure. It was desired to dismantle the line. However, the scale was found to be dangerously explosive when brought into contact with air due to the presence of the copper acetylide. Furthermore, although the scale was soluble in hydrochloric acid, the support structure for the pipe was insufficiently strong to support the pipe if filled with a liquid such as an aqueous solution of hydrochloric acid. The method of the invention was clearly applicable to effective descaling of the line.

A foaming apparatus of the type shown in FIGURE 2 of the drawing was set up. The liquid solvent for the scale was prepared in tank 64 positioned on a truck for convenience, and equipped with a pumping unit represented by pump 66. The liquid solvent was prepared according to the following procedure:

Five hundred gallons of 15 percent by weight hydrochloric acid were put in tank 64. Two gallons of an abietyl amine-type inhibitor to metal corrosion and two and one-half gallons of a surfactant frothing agent were admixed with the acid. The surfactant employed was sodium-N-methyl-N-oleoyl taurate.

Frothing chamber 50 of the foaming apparatus had a capacity of about twenty-seven cubic feet. It contains fourteen tubes of the nature of tube 52 of FIGURE 2. Tubes 52 were made of baked porous $Al_2O_3$. Foam outlet line 70 was connected to overhead line 72 which was to be descaled. Liquid inlet line 62 leading to chamber 50 was connected to tank 64 containing the liquid solvent prepared as above described and its flow regulated by valve 68. Gas inlet line 56 was connected to a source of nitrogen gas under pressure. Valve 58 was opened and the rate of flow of the gas into manifold 54 was read on flowmeter 60. The gas was then forced through the porous walls of tubes 52 and passed upwardly through the liquid 86 in chamber 50 in fine bubbles creating a mass of foam above the liquid. Foam was generated at a gas pressure of 1.5 p.s.i. and rose in line 70 until all of pipe 70 and subsequently line 72 were completely filled therewith, foam then being forced out through open valve 82 into foam drain line 78 which returned spent foam to line 62.

Foam continued to be generated and circulated through line 72 and out line 78 and then led back to line 62 and into chamber 50 for one hour. During the early part of the 1 hour treatment the effluent leaving line 78 was a deep reddish color due to dislodged and dissolved copper-containing scale. It also contained chunks of coal tar and gave off a pronounced odor of $H_2S$. As treatment progressed, the effluent became substantially clear and odorless.

Four hundred seventy gallons of liquid solvent were used to treat the line. Since the line had a capacity of about 3240 gallons, it is readily seen that only about 14½ percent by volume of the liquid was required to treat the line as a foam, of that which would have been required had unfoamed liquid been used.

A foamed water flush was then prepared by placing 500 gallons of water in tank 64 and admixing therewith a 2.5 gallons of the surfacant employed in the hydrochloric acid solvent, viz., sodium-N-methyl-N-oleoyl taurate. The aqueous liquid mixture thus prepared was then foamed similarly to the HCl solution employing nitrogen gas. Foamed water was thus produced which was blown through line 72 for a period of about 0.5 hour. Then a second foamed water fluid was prepared employing 500 gallons of water and 2.5 gallons of refined cocoamine acetate as a foaming agent and the aqueous solution thus prepared foamed by nitrogen gas in chamber 50 and forced into line 72 which was thereby further flushed out with this second foamed water solution. The total time employed to flush the last foamed water through line 72 was 1.25 hours.

Thereafter the foamed water was allowed to stand. After two hours, the foam had completely collapsed and the liquid from the foam removed from the line by merely allowing it to drain therefrom.

The overhead transfer line (represented by numeral 72 in the drawing) which, before cleaning, contained a scale explosive on contact with air, could then be dismantled with safety. If it had been desired that the line be put back in use after descaling rather than being dismantled, it could have been so done. The line would have been substantially free of scale and ready to be again used either to transfer the same or other gaseous chemicals without fear of contamination or reaction with the scale.

The tests and examples set out above show that a satisfactorily stable foam can be produced at an efficient rate employing either organic solvents or solvents composed of aqueous solutions of inorganic acids, carbonates and/or other soluble substances, to which has been admixed a foaming agent, by blowing a gas upwardly through the solvent. They have shown that a small amount of solvent can be formed into a relatively large volume of foam, and, as formed, be introduced into vessels, e.g., pipes, coils, tanks, and similar equipment having an adhering substance, e.g., a scale, on the interior surface thereof to be removed, by the force of the gas employed for producing the foam, thereby filling the vessels and contacting the entire scale coated surface of the equipment with foamed solvent. The scale is effectively dissolved and/or dislodged and suspended in the foam which is subsequently flushed therefrom by a chaser foam. The chaser foam or liquid produced by its collapse is then removed. In some instances, e.g., in vertical columns or tanks and lines having sufficient gradient, the foam is merely allowed to collapse upon standing and drained therefrom. In other instances, it is advisable to blow it out, preferably with a gas which is substantially unreactive with the surface of the equipment, e.g., nitrogen, or an inert gas.

Additives for thickening the solvent or stiffening the foam, e.g. a gum, such as guar gum, can be admixed with the liquid solvent, if desired. Suitable amounts to use, for example, are amounts up to about 0.25 percent by weight of the solvent.

The foaming apparatus or foamer used may be one similar to the types shown in the drawing, but any type may be used which provides for release of a gas in finely divided bubbles into the liquid solvent, passage of the gas bubbles upwardly through the liquid solvent, and forcing of the foam being made into the vessel to be descaled. The vessel may be a long pipe, sinuous coil, elevated tank, tower, or the like and may be located at some distance from the foam generator since the foam is sufficiently stable to resist collapse while being carried long distances through transfer lines.

Having described the invention, what is claimed and desired to be protected by Letters Patent is:

1. The method of treating the interior surface of a confining vessel to remove an adhering substance therefrom which consists essentially of delivering a stream of gas into a confined quantity of a liquid solvent for said adhering substance, said solvent containing in admixture therewith between 0.01 and 1.0 percent by volume thereof of a surfactant, the gas being substantially unreactive with the solvent, dispersing the gas in the solvent to form a fluid foam of the gas and solvent, continuing to deliver and disperse the incoming gas to force the foam as formed in a confined stream to the vessel being treated at a rate in excess of the collapse rate of the foam so as to fill the vessel substantially, maintain the foam in contact with the interior surface of the vessel so filled until at least a portion of said adhering substance is removed by the foam, and continually circulating the foam through the vessel at an average rate of at least 0.1 foot per minute.

2. The method of claim 1 wherein effluent leaving said vessel is recycled back into said liquid solvent and is refoamed and reused in a continuous treating process.

3. The method of claim 2 wherein said effluent is collapsed by introducing a jet of gas into the effluent.

4. The method of claim 1 wherein said liquid solvent is an aqueous solution of a water-soluble solvent for said adhering substance.

5. The method of claim 4 wherein said aqueous solution is a 5–30 percent by weight aqueous solution of HCl.

6. The method of claim 1 wherein said liquid solvent is an organic solvent for said adhering substance.

7. The method of claim 6 wherein said organic solvent contains a gel formed therein by the interaction of an organic acid and a metal hydroxide.

8. The method of claim 6 wherein the organic solvent is selected from the class consisting of petroleum fractions, $CS_2$, $CCl_4$, trichloroethylene, benzene, alcohols, ethers, ketones, and aldehydes.

9. The method of claim 6 wherein the surfactant is selected from the class consisting of 2-heptadecyl imidazoline lactate, tetra-alkyl quaternary ammonium chloride, and alkyline metal salts of oil-soluble petroleum mahogany sulfonates.

References Cited in the file of this patent
UNITED STATES PATENTS

| | | |
|---|---|---|
| 1,141,243 | Foster | June 1, 1915 |
| 2,023,496 | Todd | Dec. 10, 1935 |
| 2,359,913 | Hill | Oct. 10, 1944 |
| 2,619,974 | Daley | Dec. 2, 1952 |
| 2,622,605 | Brooks | Dec. 23, 1952 |
| 2,653,116 | Whitcomb | Sept. 22, 1953 |

UNITED STATES PATENT OFFICE
CERTIFICATE OF CORRECTION

Patent No. 3,037,887 — June 5, 1962

John W. Brenner et al.

It is hereby certified that error appears in the above numbered patent requiring correction and that the said Letters Patent should read as corrected below.

Column 5, line 39, for "or" read -- for --; column 9, TABLE II, eighth column, line 1 thereof, for "0.06" read -- 6.06 --; column 13, lines 25 to 28, the formula should appear as shown below instead of as in the patent:

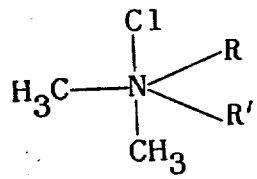

Signed and sealed this 8th day of January 1963.

(SEAL)
Attest:
ERNEST W. SWIDER
Attesting Officer

DAVID L. LADD
Commissioner of Pate